Oct. 17, 1961     T. S. GOLASKI     3,004,678

MULTI-PURPOSE CARGO CARRIER

Filed June 25, 1959     3 Sheets-Sheet 1

INVENTOR.
THEODORE S. GOLASKI
BY Herbert E. Kidder
AGENT

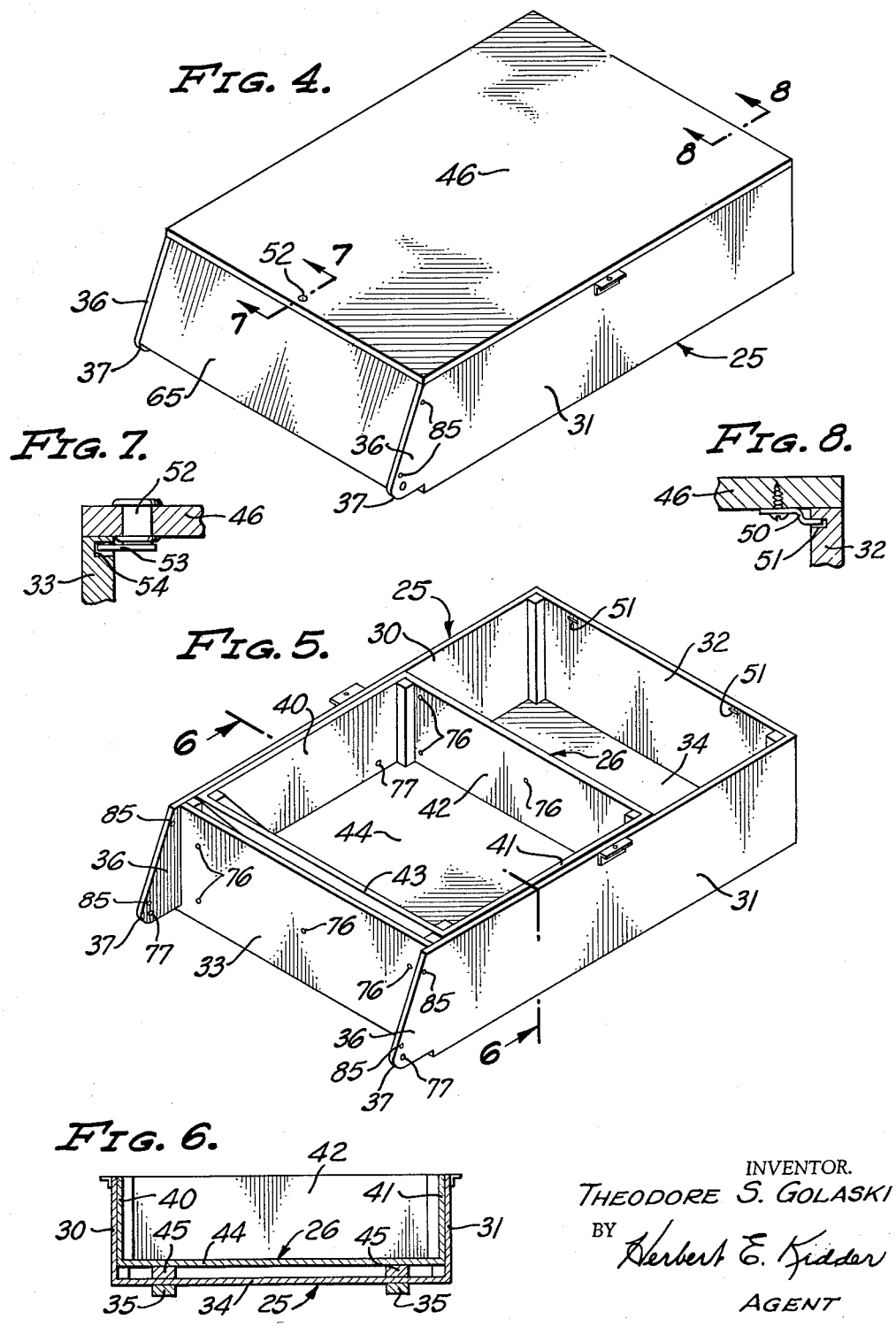

Oct. 17, 1961 T. S. GOLASKI 3,004,678
MULTI-PURPOSE CARGO CARRIER
Filed June 25, 1959 3 Sheets-Sheet 3
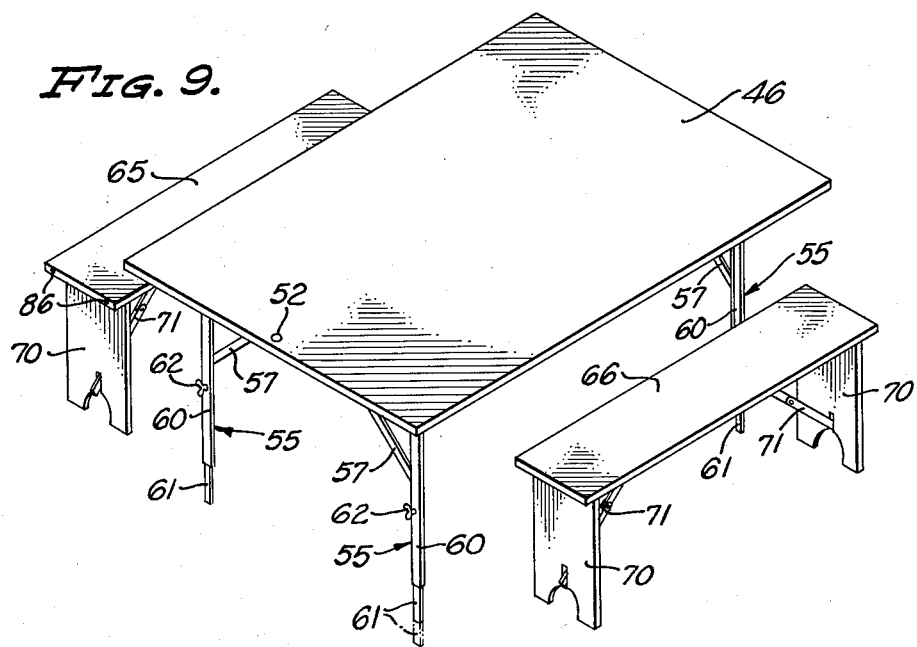
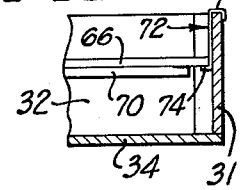
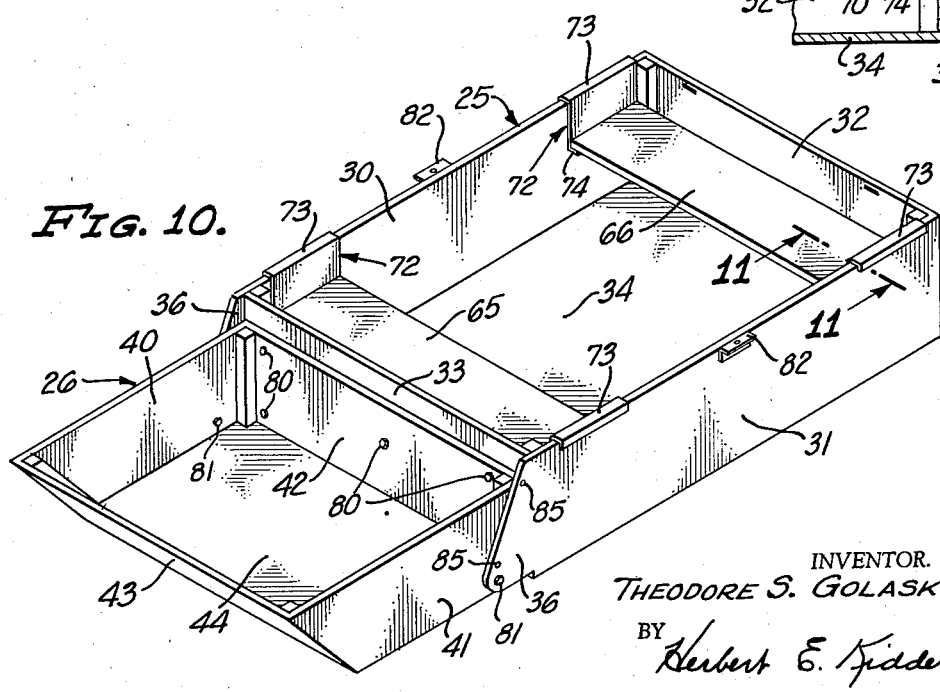
INVENTOR.
THEODORE S. GOLASKI
BY Herbert E. Kidder
AGENT

United States Patent Office 3,004,678
Patented Oct. 17, 1961

3,004,678
MULTI-PURPOSE CARGO CARRIER
Theodore S. Golaski, 8675 Palmetto Ave., Fontana, Calif.
Filed June 25, 1959, Ser. No. 822,956
6 Claims. (Cl. 214—450)

The present invention relates to multi-purpose cargo carriers for use with automotive vehicles, and more specifically to apparatus of this kind particularly adapted for use with station wagons to increase the utility thereof.

While the station wagon was originally designed as an all-purpose utility vehicle, recent styling trends such as the lowered roof, sloping back, and rearwardly protruding tailfins have had the effect of reducing the usefulness of the vehicle by making it more difficult to place heavy or awkward-to-handle packages far enough forward of the rear end to allow closing the tailgate, or to utilize the entire cargo carrying space. Further, when the back end of the station wagon is loaded with many articles, it is sometimes extremely difficult to get at a particular article that is wanted without partially unloading the vehicle so that the operator can reach the desired object.

One of the principal objects of the present invention is to provide a cargo carrier which can be carried inside of a station wagon, and which is so designed as to greatly facilitate loading or unloading; or alternatively, one which can be mounted on top of a motor vehicle to provide substantially increased cargo carrying capacity. An important feature of the invention is that the device may be extended to its fullest extent to provide maximum carrying capacity with the rear seat of the station wagon folded down, and with the rear end of the device resting on the open tailgate; or it may be assembled with one part nested inside of another to provide a more compact carrier of somewhat reduced capacity which can be carried entirely within the station wagon, with the tailgate raised.

Another important object of the invention is to provide a device of the character described having exceptional utility and which, in addition to its primary function as a cargo carrier, can be used to provide a folding-leg table with folding benches for picnicking, camping or patio use; or it can be utilized as a flat-bottomed boat which can be propelled with oars or a small outboard motor, or as a small wading pool or sand box for children.

A further object of the invention is to provide a cargo carrier which may be closed and securely locked, so that luggage or cargo contained therein is protected from theft or vandalism even though the station wagon itself is left unlocked or the windows are left open for ventilation. This feature is particularly useful to salesmen carrying valuable samples, or to package delivery carriers who carry merchandise of value. An incidental advantage of the invention for traveling salesmen, campers, and other drivers traveling long distances, is that when the carrier is installed inside a station wagon with the top in place, a large flat surface area is provided on which a mattress can be placed for short naps or overnight sleeping.

Another object of the invention is to provide a device of the character described, which is so designed that each of the several of the components thereof is capable of being used, either separately or in cooperation with other components, to perform a multitude of functions with a minimum number of parts.

Still another object of the invention is to provide a multi-purpose cargo carrier which is extremely simple in construction and adapted to mass production at low cost, and which is sturdy in construction and attractive in appearance.

The foregoing objects are achieved in the present invention by providing two generally rectangular, relatively shallow boxes, one of which is somewhat smaller in length, width and height than the other to permit the smaller one to be nested within the larger one; and the larger box being of such dimensions as to permit it to be carried entirely within the rear portion of a station wagon when the back seat thereof is folded down, or to extend out over and rest upon the opened tailgate when the back seat is erected. A pair of laterally spaced tracks having rollers journaled thereon are mounted within the station wagon on the flat bed thereof, and the said boxes are provided on their undersides with longitudinally extending runners or skids, which glide on the rollers. A lid is provided which covers the entire top of the larger box and locks into place to protect the contents of the box from theft or vandalism. This lid is provided with folding legs which also telescope, and when the legs are pulled down into place, the lid forms a table of generous size for use in camping, picnicking, or at home in the patio. The telescoping legs enable the table to be leveled when the ground is sloping or irregular.

The two boxes are of water-proof construction, and are adapted to be bolted together end to end, to form a flat-bottomed boat. Brackets are provided on opposite sides of the larger box to receive oarlocks for rowing the boat, or a small outboard motor may be mounted on one end of the boat to propel the same. Seats are provided for the boat, and these seats have folding legs that permit them to double as benches to be used with the table or wherever extra benches may be required. Being of water-proof construction either or both of the boxes may be set on the ground and filled with water to provide a wading pool for small children, or the boxes may be filled with sand to provide a sand box.

These and other objects and advantages of the present invention will become apparent to those skilled in the art upon consideration of the following detailed description of the preferred embodiment thereof, reference being had to the accompanying drawings wherein:

FIGURE 4 is a perspective view of the nested boxes with the cover in place;

FIGURE 5 is a similar view of the same with the cover removed;

FIGURE 6 is a cross sectional view taken at 6—6 in FIGURE 5;

FIGURE 7 is an enlarged fragmentary sectional view, taken at 7—7 in FIGURE 4;

FIGURE 8 is another enlarged fragmentary sectional view, taken at 8—8 in FIGURE 4;

FIGURE 9 is a perspective view showing the lid of the box set up as a table with the folding-leg benches set up for use;

FIGURE 10 is a perspective view showing the two boxes bolted together end to end, to form a flat-bottomed boat; and FIGURE 11 is a fragmentary sectional view taken at 11—11 in FIGURE 10, showing one of the hangers for supporting the ends of the seats.

Figure 1:
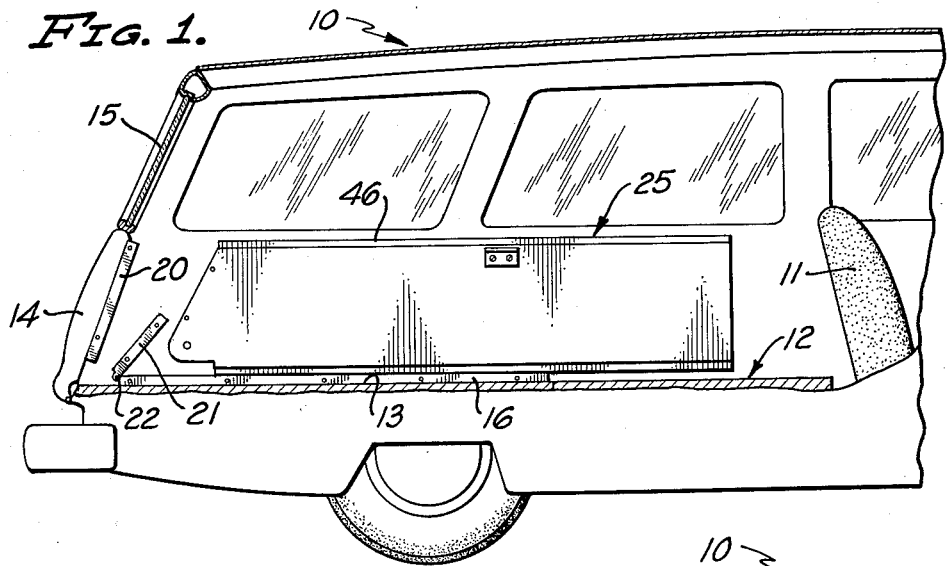
FIGURE 1 is a partially sectioned, fragmentary elevational view of station wagon automobile, showing my invention mounted therein, with the smaller box nested inside the larger box, and the cover locked in place.
Figure 2:
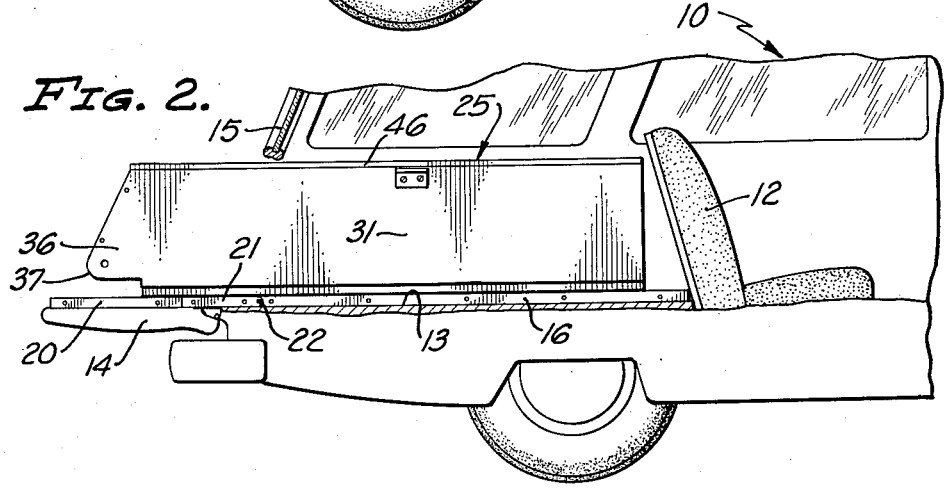
FIGURE 2 is a similar view, showing the rear seat of the station wagon raised up to passenger carrying position, and the cargo carrier moved aft so that it extends out over and rests upon the opened tailgate of the station wagon.
Figure 3:
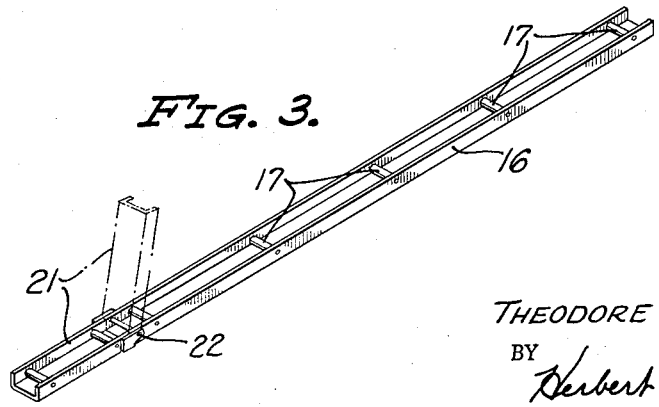
FIGURE 3 is a perspective of one of the tracks having rollers journaled thereon, which is mounted within the station wagon.

In FIGURES 1 and 2 of the drawings the reference numeral 10 designates a station wagon, having a front seat 11 and rear seat 12, the latter being hinged so that it can be folded down to form a continuation of a flat bed 13. At the rear end of the station wagon is a tailgate 14, which is hinged to fold down to the horizontal position shown in FIGURE 2, and above the tailgate is a rear window frame 15, which is mounted so that it can be swung upwardly to provide free access from the rear end.

Mounted within the station wagon on the flat bed or floor 13 are two laterally spaced, fore and aft extending tracks 16, each of which is in the form of an upwardly facing channel iron having a plurality of rollers 17 journaled between the upwardly projecting flanges thereof. Extensions 20 of the track are attached to the tailgate 14 in alignment with tracks 16; and hinged bridging sections 21 are pivoted at 22 on the rear end of the track 16 so that they can be swung down to bridge the gap between the floor 13 and the tailgate 14 when the latter is down in the horizontal position shown in FIGURE 2.

As best shown in FIGURE 5, the cargo carrier of the present invention consists of two generally rectangular, relatively shallow boxes 26 and 25 which may be used in many ways to perform a multitude of functions. Box 25 is considerably larger than box 26, and the latter is adapted to nest within the former. By way of illustration, box 25 may have dimensions of the order of 64 inches long, by 42 inches wide, and 12 inches deep, whereas box 26 may be of the order of 36 inches long, by 40½ inches wide, and 10½ inches deep. Both of the boxes are of water proof construction, and are preferably made of exterior grade or marine grade plywood, although they may be made of plastic or any other material of suitable properties. Box 25 consists of parallel side panels 30 and 31, parallel end panels 32 and 33 and bottom panel 34. These panels are joined together along their edges and are rigidly braced at their corners in any suitable manner. Fixed to the underneath side of the bottom panel 34 are two laterally spaced, fore and aft extending runners or skids 35, which are located so as to engage the rollers 17 on tracks 16. The two side panels 30, 31 project beyond the end panel 33 to provide extensions 36, and these are cut off at a downwardly and rearwardly inclined angle, as shown, with a radiused corner at 37. The extensions 36 are used when the two boxes are joined together end to end, as will be explained in more detail presently.

Box 26 consists of parallel side panels 40 and 41, end panels 42 and 43, and bottom panel 44, all of which are joined together along their edges and are rigidly braced at their corners in any suitable manner. Box 26 also has a pair of laterally spaced, fore and aft extending runners or skids 45 attached to the underneath side of the bottom panel 44. These runners 45 are spaced apart the same distance as runners 35 so that the runners 35 and 45 line up with one another when the boxes are mounted end to end, as shown in FIGURE 10. End panel 43 is preferably inclined to the vertical so as to form a downwardly and rearwardly sloping bow when the device is used as a boat (FIGURE 10).

In FIGURE 5, box 26 is shown nested within box 25 for compactness, and the top edges of the box are substantially flush with the top edges of the box 25. In this condition, the two boxes can be closed by a flat, rectangular cover or lid 46 which rests on the top edges of the side and end panels of box 25. Secured to the underside of cover 46 adjacent one end thereof, are two laterally spaced Z brackets 50 (see FIGURE 8) which engage slots 51 in end panel 32 near the top edge thereof. The brackets 50 serve to secure that end of the cover to the box 25, and also function as hinges which are disengageable from the end 32 to permit the cover to be removed entirely. Mounted within the cover 46 near the other end thereof is a key-operated lock 52 (see FIGURE 7) having a latch 53 which is engageable in a slot 54 in end panel 33. The lock 52 serves to lock the cover 46 securely to the box, thereby protecting the contents of the box from theft or vandalism.

Pivotally connected to the underside of the cover 46 at the four corners thereof are legs 56, which are braced by means of folding braces 57. Each leg 56 consists of an outer member 60 and inner member 61 telescopically associated therewith. A thumb screw 62 is screwed into a tapped hole in the outer leg 60, and engages the inner member 61 to lock the same in adjusted position. This arrangement enables the legs to be adjusted to any desired length so as to permit the tables to be leveled on sloping or uneven ground.

Two seat benches 65 and 66 are provided, which have folding legs 70, that are braced by jack-knife braces 71. The legs 70 may be folded flat against the bottom side of the seats 65, 66 for compact storage, or when they are used as boat seats (FIGURE 10), or the legs may be swung down to the vertical position with braces locked, as in FIGURE 9, and used around the table or wherever else a bench is needed. When used as boat seats, the seats 65, 66 are supported at their ends on hangers 72, as shown in FIGURES 10 and 11.

Each hanger 72 has a hook portion 73 at its upper end, and an inwardly bent flange 74 at its lower end. The hook 73 passes over and hooks onto the top edge of the adjacent side panel 30, 31 while the flange 75 extends under and supports the end of the seat 65, 66.

Box 26 is adapted to be bolted to end panel 33 of box 25 to form the flat bottom boat shown in FIGURE 10. For this purpose, end panel 42 of box 26, and end panel 33 of box 25 are provided with aligned holes 76 through which bolts 80 are passed. Other bolts 81 are passed through aligned holes 77, in the extensions 36 and side panels 40, 41 of box 26. Bolts 81, being spaced rearwardly from the plane of bolts 80, provide considerable strength and rigidity to the assembled structure. When the bolts 80 and 81 are drawn up tight, the two boxes are quite watertight and provide an extremely stable and safe boat capable of carrying several people. For boating purposes two seats 65 and 66 are supported from the hangers 72, as shown in FIGURE 10.

The boat shown in FIGURE 10 may be propelled by a small outboard motor mounted on the rear panel 32, or it may be rowed with oars. To this end, angle brackets 82 are attached to the two side panels 30, 31 adjacent the top edge thereof, and the outwardly turned flanges of the brackets are apertured to receive oarlocks. The two fore and aft extending runners 35, 45, on the bottom of the boat serve as keels to give directional stability to the boat, and the same runners protect the bottom when the boat is pulled up on the beach, as the runners take most of the wear.

If it is desired to use the cargo carrier as a wading pool for small children, the two boxes may be assembled as shown in FIGURE 10 and placed on the ground. Being water-tight, they may be filled with water to provide a safe wading pool for small children that will afford many hours of pleasure on warm summer days. The seats 65 and 66 may be removed for this purpose, or left in place, if it is so desired.

When the two boxes 25, 26 are nested together for transport or cargo carrying purposes, seat 66 may be carried inside the boxes, while seat 65 is inserted between the two extensions 36 so that its outer surface is flush with the inclined rear edges of the extensions, and is secured by pins which are insterted through holes 85 in the extension 36 and corresponding holes 86 in the ends of the seat 65 (FIGURE 9). The inclined rear surface presented by the cargo carrier when thus assembled is neat in appearance, particularly when the end projects from the rear of the station wagon onto the open tailgate, as the rear end of the station wagon is usually sloped to about the same angle.

The many advantages of the invention for cargo carrying purposes will be immediately apparent to those skilled in the art. The entire box may be loaded to capacity with relatively little exertion upon the part of the person loading the car, owing to the ease with which the box glides in and out of the body of the station wagon on the rollers 17. Thus, the box may be pulled out to its furthest extent while the front end of the box is being loaded, and then pushed forward into the car as the box is filled up. There is no need to climb into the car to wrestle with heavy or awkward loads, and everything is immediately accessible without unnecessary unloading or rearranging of the cargo.

For maximum carrying capacity, the two boxes 25, 26 may be bolted together, as in FIGURE 10, in which case the box 26 will project out of the rear end of a station wagon and rest upon the open tailgate. Alternatively, the box 26 can be carried separately on top of the station wagon or other vehicle, while box 25 is carried inside. Where less carrying capacity is required, and particularly where it is desirable to have the rear seat of the station wagon available for passengers, the larger box 25 can be stored in the garage, and just the smaller box 26 used. Owing to its shorter length, the smaller box 26 can be carried in the back end of the station wagon with the rear seat erected and with the tailgate closed. The runners 45 glide on the rollers 17, and the box 26 can therefore be moved in and out with the same ease as the larger box 25. The smaller box 26, by itself, is particularly useful for general day-to-day service, such as carrying groceries or other packages. Various other possibilities will occur to those skilled in the art, as well as other uses of the invention.

While I have shown and described in considerable detail what I believe to be the preferred form of my invention, it will be understood that various changes may be made without departing from the scope of the appended claims.

I claim:

1. A multi-purpose cargo carrier for use with a station wagon automobile having a flat bed in the rear end portion thereof, said cargo carrier including a pair of laterally spaced, fore and aft extending tracks mounted on said flat bed, a pair of relatively shallow open top boxes of generally rectangular configuration, each of said boxes having a pair of laterally spaced, longitudinally extending runners on the bottom sides thereof which are located so as to run on said tracks, one of said boxes being smaller than the other so that said one box may be nested within the larger box for compactness, and means for joining said boxes together end to end so as to provide an extended carrier of maximum cargo carrying capacity, said runners on said smaller box being aligned with said runners on the larger box, whereby both of said boxes are supported on said tracks.

2. A multi-purpose cargo carrier for use with a station wagon automobile having a flat bed in the rear end portion thereof, said cargo carrier including a pair of laterally spaced, fore and aft extending tracks mounted on said flat bed, a pair of relatively shallow open top boxes of generally rectangular configuration, each of said boxes having a pair of laterally spaced, longitudinally extending runners on the bottom sides thereof which are located so as to run on said tracks, one of said boxes being smaller than the other so that said one box may be nested within the larger box for compactness, a flat rectangular cover having hinge means on one edge thereof releasably engaging one edge of said larger box, said cover having locking means on the opposite edge thereof engageable with companionate means on the adjoining edge of said larger box so as to enclose and secure the contents of said larger box against theft or vandalism, and means for joining said boxes together end to end so as to provide an extended carrier of maximum cargo carrying capacity, said runners on said smaller box being aligned with said runners on the larger box, whereby both of said boxes are supported on said tracks.

3. A multi-purpose cargo carrier as defined in claim 2, wherein said cover has folding legs at the four corners thereof, so that said cover may be converted into a table.

4. A multi-purpose cargo carrier for use with a station wagon automobile having a flat bed in the rear portion thereof, said cargo carrier including a pair of laterally spaced, fore and aft extending tracks mounted on said flat bed, each of said tracks having a plurality of rollers journaled thereon, a pair of relatively shallow open top boxes of generally rectangular configuration, each of said boxes being of watertight construction and having a pair of laterally spaced longitudinally extending runners on the bottom side thereof which are located so as to glide on said rollers, one of said boxes being smaller than the other so that said one box may be nested within the larger box for compactness, and means for joining said boxes together end to end, said boxes being watertight when so joined together so that they may be used as a small flat bottom boat, said runners on the bottom of said boxes serving as keels to give said boat directional stability, and also serving to protect the bottom when the boat is beached.

5. A multi-purpose cargo carrier for use with a station wagon automobile having a flat bed in the rear portion thereof, and a tailgate hinged to the back end thereof which is swingable down to a horizontal open position, said cargo carrier including a pair of laterally spaced, fore and aft extending tracks mounted on said flat bed, a bridging track section hinged to the rear end of each of said tracks for vertical swinging between an upstanding position within the station wagon and a horizontal position bridging the gap between said flat bed and the open tail gate, said bridging section overlying said open tailgate when in said horizontal position, both said track sections and said bridging sections having a plurality of rollers journaled thereon, a pair of relatively shallow open top boxes of generally rectangular configuration, one of said boxes being smaller than the other so that said one box may be nested within the other for compactness, both of said boxes having laterally spaced, fore and aft extending runners on the bottom sides thereof which are located so as to glide on said rollers of said tracks, means for joining said boxes together end to end with said runners on said smaller box aligned with said runners on the larger box, and a cover having hinge means along one edge thereof releasably engaging one edge of said larger box, said cover having a lock adjacent the opposite edge which is engageable with the adjoining edge of said larger box, said cover having folding legs at the four corners thereof which can be swung down to form a table when said cover is removed from said box.

6. A multi-purpose cargo carrier as defined in claim 5, wherein the sides of said larger box project beyond one end thereof to form extensions, said extensions overlying the sides of said smaller box when the latter is joined end to end with the larger box, said means for joining said boxes end to end including bolts projecting through aligned holes in said extensions and in the sides of said smaller box, and said means for joining said boxes further including a plurality of bolts projecting through aligned holes in the adjoining ends of said boxes.

References Cited in the file of this patent

UNITED STATES PATENTS

| | | |
|---|---|---|
| 1,279,635 | Belvel | Sept. 24, 1918 |
| 2,157,186 | Pinter | May 9, 1939 |
| 2,788,137 | Harkness | Apr. 9, 1957 |

FOREIGN PATENTS

| | | |
|---|---|---|
| 154,999 | Australia | Feb. 3, 1954 |